(12) United States Patent
Wan

(10) Patent No.: US 9,277,391 B2
(45) Date of Patent: Mar. 1, 2016

(54) PAIRING METHOD BETWEEN BLUETOOTH DEVICES AND BLUETOOTH SYSTEM USING THE SAME

(71) Applicant: Min-Chuan Wan, Changhua (TW)

(72) Inventor: Min-Chuan Wan, Changhua (TW)

(*) Notice: Subject to any disclaimer, the term of this patent is extended or adjusted under 35 U.S.C. 154(b) by 0 days.

(21) Appl. No.: 14/170,215

(22) Filed: Jan. 31, 2014

(65) Prior Publication Data

US 2014/0220897 A1    Aug. 7, 2014

(30) Foreign Application Priority Data

Feb. 1, 2013    (TW) .............................. 102104058 A

(51) Int. Cl.
*H04B 7/00* (2006.01)
*H04W 8/00* (2009.01)
*H04W 12/04* (2009.01)
*H04W 84/18* (2009.01)

(52) U.S. Cl.
CPC .............. *H04W 8/005* (2013.01); *H04W 12/04* (2013.01); *H04W 84/18* (2013.01)

(58) Field of Classification Search
CPC ..... H04W 8/005; H04W 12/04; H04W 12/06; H04W 24/02; H04W 84/12; H04W 84/18; H04W 88/08; H04W 88/18; H04W 8/26

USPC ......................................................... 455/41.2
See application file for complete search history.

(56) References Cited

U.S. PATENT DOCUMENTS

| 8,768,999 B2 * | 7/2014 | Lee ................... G06F 17/30047 709/203 |
| 2005/0211780 A1 * | 9/2005 | Tanaka ............... H04N 1/00249 235/462.15 |
| 2012/0258664 A1 * | 10/2012 | Kinneberg ............ H04W 8/005 455/41.2 |
| 2012/0287290 A1 * | 11/2012 | Jain ........................ H04L 63/18 348/207.1 |
| 2012/0311623 A1 * | 12/2012 | Davis et al. ..................... 725/18 |

* cited by examiner

*Primary Examiner* — Ajibola Akinyemi
(74) *Attorney, Agent, or Firm* — Che-Yang Chen; Law Office of Michael Chen

(57) ABSTRACT

A pairing method between Bluetooth devices can be applied to a Bluetooth system, a Bluetooth client and a Bluetooth server. The Bluetooth server has an image corresponding to an identifier of the Bluetooth server. A Bluetooth client device captures the image, analyze the image to obtain the identifier, and send out a pairing command having the identifier. The Bluetooth server starts a connected mode with the Bluetooth client according to the pairing command.

16 Claims, 4 Drawing Sheets

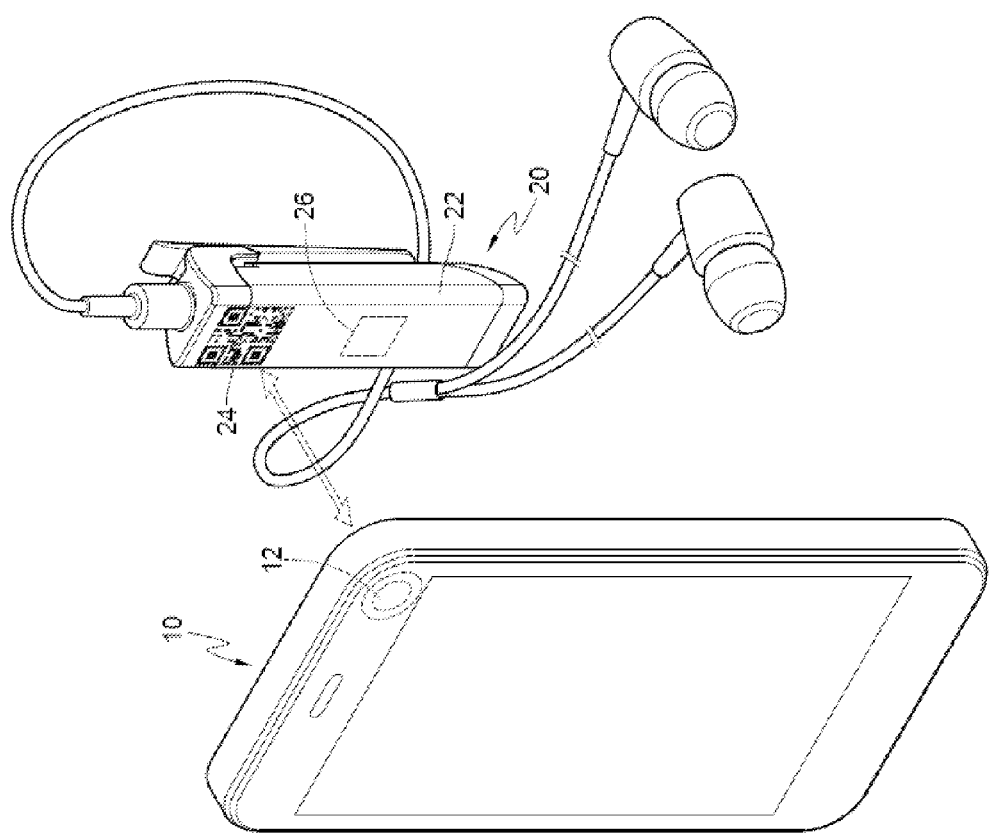

PAIRING METHOD BETWEEN BLUETOOTH DEVICES AND BLUETOOTH SYSTEM USING THE SAME

FIELD OF THE INVENTION

The present invention relates to a pairing method between Bluetooth devices, and more particularly to a Bluetooth system, Bluetooth server and Bluetooth client using the pairing method.

BACKGROUND OF THE INVENTION

In the field of telecommunication, Bluetooth technology belongs to a wireless personal area network (WPAN). Bluetooth technology is now widely used in cell phones, headsets, personal digital assistants (PDAs) and computers to enable the abovementioned devices to communicate via Bluetooth technology.

The devices equipped with Bluetooth technology can all be referred to Bluetooth devices. The Bluetooth devices have to be paired before being used and the pairing process is rather complicated. In addition to some default settings, passwords are required during the pairing process. It would be very difficult for a lay person to pair the Bluetooth devices without reading a manual or having someone familiar with the pairing process to help. Even for a user who has paired the Bluetooth devices, when the user tries to pair a new headset or cell phone, it is difficult to recall all the steps after a long period of time, let alone the passwords is missing or forgotten.

Also, when the user buys a new Bluetooth device at a store, the sales person in the store may help the user with pairing. Meanwhile, there may be some other customers also pairing their own Bluetooth devices, so the problem of wrongful pairing may happen. This problem is more serious in Bluetooth 4.0 because the communication range for Bluetooth 4.0 increases to 50 meters, meaning that the Bluetooth devices that haven't been paired within 50 meters can all be targeted and the chance for wrongful pairing increases as well. Furthermore, Bluetooth devices are more and more popular due to the development of the Bluetooth technology, so the pairing problems stated above are getting worse. Therefore, there remains a need for a new and improved pairing method to overcome the problems stated above.

SUMMARY OF THE INVENTION

To overcome the problems stated above, the present invention provides a pairing method between Bluetooth devices, and more particularly to a Bluetooth system, Bluetooth server and Bluetooth client using the pairing method.

In one embodiment, a pairing method between Bluetooth devices may include steps of a Bluetooth client retrieving an image, said image corresponding to an identifier; said Bluetooth client analyzing the image to obtain the identifier; and said Bluetooth client sending out a pairing command that includes the identifier.

In another embodiment, a pairing method between Bluetooth devices may include steps of a Bluetooth server receiving a pairing command, said pairing command including an identifier; the Bluetooth server determining whether the identifier is correct; the Bluetooth server determining whether the Bluetooth server's status is unbundled; and starting a connected mode if the identifier is correct and the Bluetooth server is unbundled.

In still another embodiment, a Bluetooth system may include a Bluetooth server including an image corresponding to an identifier; a Bluetooth client used to retrieve and analyze the image to obtain the identifier and send out a pairing command that includes the identifier; said Bluetooth server starting a connected mode with the Bluetooth client according to the pairing command.

In a further embodiment, the Bluetooth client includes a camera module to retrieve the image; a first Bluetooth module to communicate with the Bluetooth server; and a processing unit connecting with the camera module and the first Bluetooth module to analyze the image to obtain the identifier, and send out the pairing command to start the connected mode from the first Bluetooth module.

In still a further embodiment, the Bluetooth server includes an image and a second Bluetooth module inside a shell of the Bluetooth server and communicating with the first Bluetooth module; said second Bluetooth module configured to receive the pairing command, determine whether the identifier is correct and whether the second Bluetooth module is unbundled, and start the connected mode.

BRIEF DESCRIPTION OF THE DRAWINGS

FIG. 1 is a schematic view of a Bluetooth system in the present invention.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 2A:
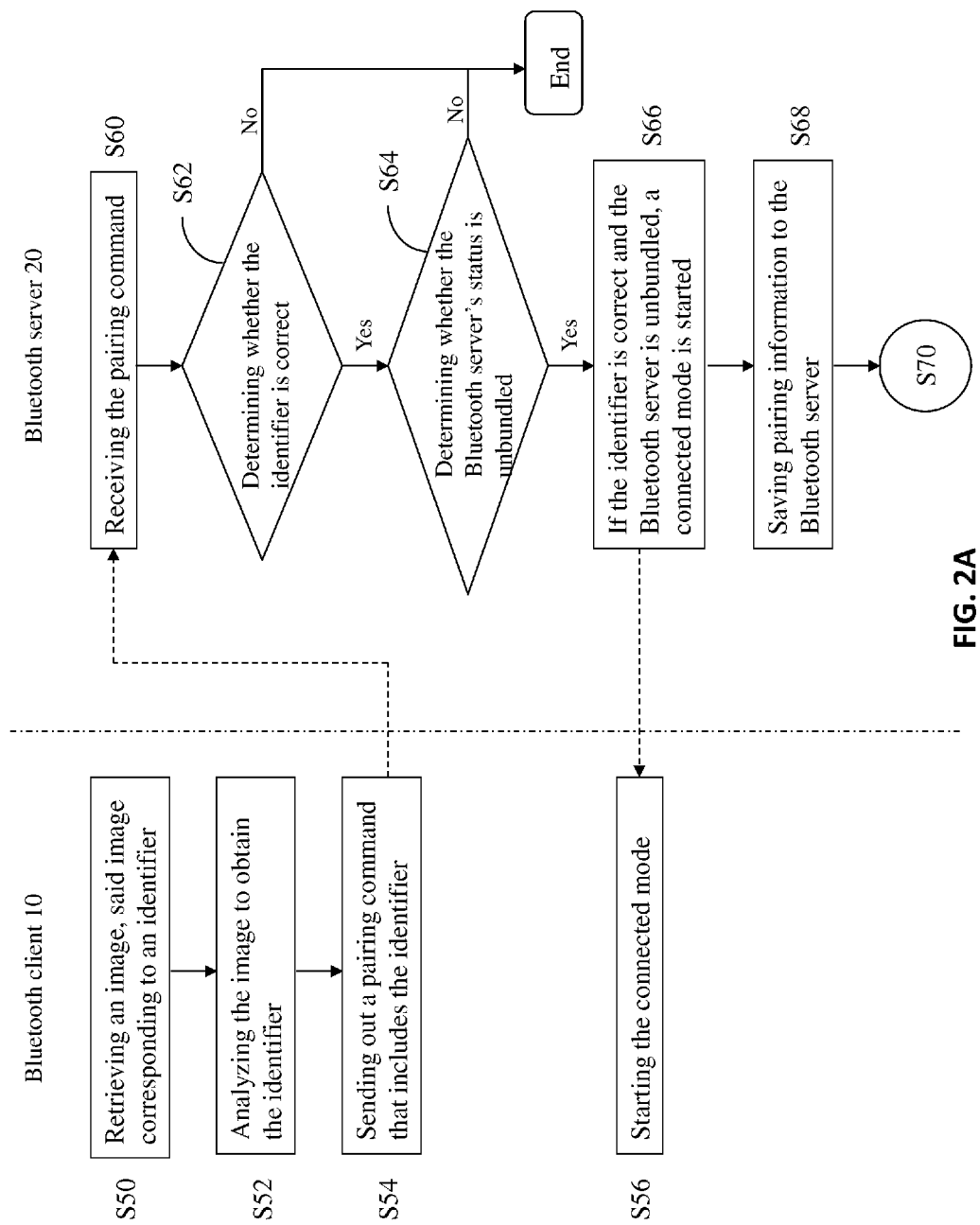
FIGS. 2A and 2B illustrates flow diagrams of a pairing method between Bluetooth devices in the present invention.
Figure 2B:
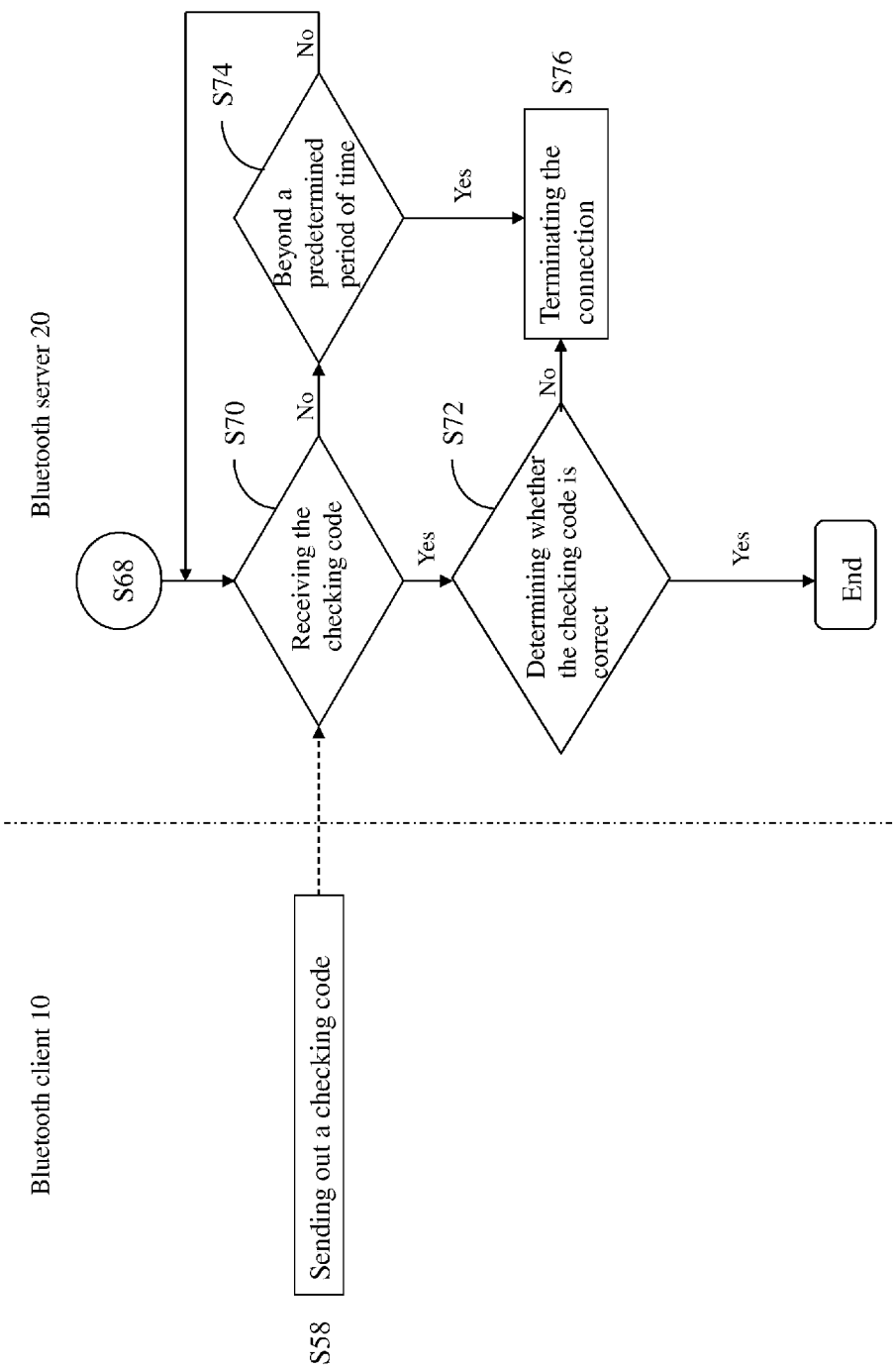

In order to further understand the goal, characteristics and effect of the present invention, a number of embodiments along with the drawings are illustrated as following:

Referring to FIGS. 1, 2A and 2B, wherein FIG. 1 is a schematic view of a Bluetooth system in the present invention, and FIGS. 2A and 2B shows flow diagrams of a pairing method between Bluetooth devices in the present invention.

The Bluetooth system may include a Bluetooth client 10 (or a connection device) and a Bluetooth server 20 (in some literature, the Bluetooth server 20 is referred to a servant device). In some embodiments, the Bluetooth client 10 and Bluetooth server 20 are collectively called Bluetooth devices. In other words, any device equipped with Bluetooth technology can be called a Bluetooth device. A Bluetooth system with two Bluetooth devices is generally divided into two ends, including a passive server end and an active client end. The passive server end can be the Bluetooth server 20 as stated above, while the active client end can be the Bluetooth client 10.

The Bluetooth device can be, but not limited to a cell phone, computer, tablet, personal digital assistant (PDA), headset, mouse, keyboard, etc. Generally speaking, some Bluetooth devices can be set as either a Bluetooth client 10 or Bluetooth server 20 to connect with another Bluetooth device, such as computers and cell phones. In other embodiments, the Bluetooth devices can be set as a Bluetooth server 20 by default. These Bluetooth devices include, but not limited to headsets, keyboards, etc. In the present invention, the headset is used as an example of the Bluetooth server 20 and the cell phone is used as an example of the Bluetooth client 10, however, the present invention is not limited to this example.

Figure 3:
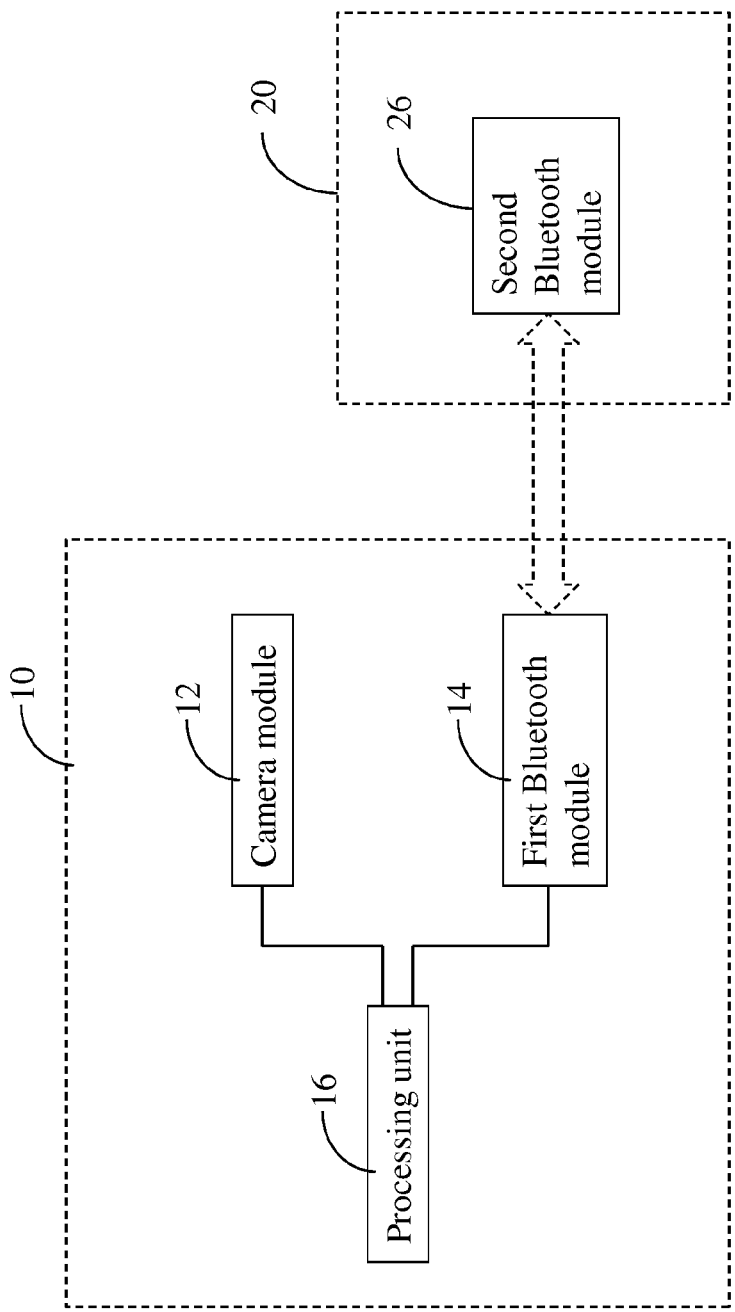
FIG. 3 is a schematic view of the block diagram of the circuit in the Bluetooth system in the present invention.

FIG. 3 is a schematic view of the block diagram of the circuit in the Bluetooth system in the present invention. The Bluetooth client 10 has a camera module 12, a first Bluetooth module 14 and a processing unit 16. The Bluetooth server 20 has a shell 20 (see FIG. 1), an image 24 (see FIG. 1) and a second Bluetooth module 26 (see FIG. 3).

In one embodiment, the pairing method in the present invention can be achieved with a software (not limited to Application software, or Apps) between the Bluetooth devices. The method can be partially done by manual operation and partially done by the hardware in the Bluetooth client devices. An "App" is used in the Bluetooth client 10 in the following example, but the present invention is not limited thereto.

Referring to FIG. 2A, a pairing method of a Bluetooth client 10 may include steps of S50: retrieving an image corresponding to an identifier; S52: analyzing the image to obtain the identifier; and sending out a pairing command that includes the identifier.

In one embodiment, the step of retrieving an image may include a step of using the camera module 12 to retrieve an image 24 of the Bluetooth server 20. The image 24 can be retrieved by any other communication means with the Bluetooth client 10. For example, if the Bluetooth client 10 and Bluetooth server 20 are wiredly or wirelessly communicated, the Bluetooth client 10 can obtain the image 24 from the Bluetooth server 20. Thus, step S50 should cover "retrieving an image 24," "receiving an image with an image 24," and "retrieving an image with an image 24."

The image 24 is corresponding with an identifier that represents the Bluetooth client 20. In an exemplary embodiment, the identifier is used as a "Universal Unique Identifier" (or unique Bluetooth address) to enable the Bluetooth server 20 to connect with another Bluetooth device. The identifier can be, but not limited to the Bluetooth device's Universal Unique Identifier (UUID) or Media Access Control address (MAC address).

The image 24 can be any form to represent the identifier, such as words, numbers, one-dimensional Bar Code, two-dimensional Bar Code, Quick Response Code (QR code), etc. In one embodiment, the image 24 can be located outside the Bluetooth server 20 or on the package thereof.

Before step S50, the pairing method in the present invention may further include a step of activating the camera module 12 of the Bluetooth client 10. This step can be achieved automatically by a program inside the Bluetooth client 10, or by manual operation.

In step S52, the processing unit 16 of the Bluetooth client 10 is configured to analyze the image 24 to obtain the identifier, which can be done by any imaging processing means, including but not limited to a QR Code reader.

In step S54, the Bluetooth client 10 can send out a pairing command from the first Bluetooth module 14, said pairing command at least including an identifier after being analyzed (such as the UUID of the Bluetooth server 20) and the UUID of the Bluetooth client 10.

The pairing command in the present invention is between an unbundled Bluetooth client 10 and a Bluetooth server 20, and the pairing command is sent from either the Bluetooth client 10 or Bluetooth server 20 when they are pairing at the first time. In general, when both Bluetooth devices are "handshaking," both sides would require the confirmation of passwords. When the Bluetooth client 10 and Bluetooth server 20 are originally connected and then disconnected, the pairing command to reconnect the Bluetooth client 10 and Bluetooth server 20 is called a connection command, which means there is no password confirmation when both devices are handshaking.

Before step S54, the pairing method may further comprise a step of activating the first Bluetooth module 14 of the Bluetooth client 10. This step can be achieved automatically by a program inside the Bluetooth client 10, or by manual operation. Generally speaking, once the Bluetooth module 14 in the Bluetooth client 10 (e.g. cell phone), it would automatically enter a seeking mode.

In another embodiment, before step S54, the pairing method may further include a step of activating the second Bluetooth module 26 of the Bluetooth server 20. In general, when the second Bluetooth module 26 of the Bluetooth server 20 is activated, it would enter an advertising mode. So, all Bluetooth clients 10 under the seeking mode may be able to find the Bluetooth server 20. When the Bluetooth server 20 is under the advertising mode, it can be used to receive the pairing command from the Bluetooth client 10.

When the Bluetooth server 20 is turned on, it can be either bundled (with pairing information) or unbundled (without pairing information). The pairing information can be the UUIDs saved in the Bluetooth devices 10 and 20. More specifically, the bundled Bluetooth server 20 would have saved the UUID of the Bluetooth client 10, while the bundled Bluetooth client 10 would have saved the UUID of the Bluetooth server 20. When the Bluetooth server 20 already has the pairing information, the Bluetooth server 20 would connect with the Bluetooth client 10 if the identifier matches the pairing information. When the Bluetooth server 20 has no pairing information, the Bluetooth server 20 would determine whether to connect according to whether the identifier in the pairing command matches the UUID of the Bluetooth server 20.

In an exemplary embodiment, when the Bluetooth server 20 receives the pairing command that includes the identifiers of the Bluetooth client 10 and Bluetooth server 20, the Bluetooth server 20 can establish connection via the identifier of the Bluetooth client 10, meaning entering a connection mode.

More specifically, referring to FIG. 2A, the pairing method for the Bluetooth server 20 may include steps of S60: receiving a pairing command that includes an identifier; S62: determining whether the identifier is correct; S64: checking the Bluetooth server's status to confirm that the status thereof is "unbundled," and S66: entering the connected mode if the identifier is correct and the status of the Bluetooth server is unbundled.

In step S60, the second Bluetooth module 26 of the Bluetooth server 20 is used to receive the pairing command, and the Bluetooth server 20 is configured to determine whether the identifier is correct and whether the status of the Bluetooth server 20 is unbundled, namely, whether the Bluetooth server 20 has saved the identifier of the Bluetooth client 10. If the identifier of the Bluetooth server 20 is correct and the Bluetooth server 20 is unbundled, the Bluetooth server 20 can proceed to the connected mode. It is noted that steps S62 and S64 can be swapped, and in step S62, the Bluetooth server 20 would check whether the identifier sent from the Bluetooth client 10 is identical with Bluetooth server's identifier. If identical, the Bluetooth client 10 would proceed to connect with the Bluetooth server 20. Thus, when the Bluetooth server 20 is unbundled, it can start the connected mode with the Bluetooth client 10. It is noted that the unbundled status means the pairing information in the Bluetooth server 20 does not have the identifier of the bundled Bluetooth client 10. In other words, there is no data in the memory (used to save the information of the Bluetooth client 10) of the Bluetooth server 20.

In another embodiment, in steps S60-64, the Bluetooth server 20 can determine whether itself is unbundled. If it is, when receiving the pairing command (S60), the Bluetooth server 20 only has to proceed to determine whether the identifier is correct, and after confirming the identifier is correct, it can proceed with the connected mode.

Accordingly, the image 24 of the Bluetooth server 20 represents the identifier of the Bluetooth server 20, such as UUID. Thus, when the Bluetooth client 10 retrieves the image 24 and sends out the pairing command, it is unlikely to cause any mistake about pairing.

In a further embodiment, step 68: saving a paring information to the Bluetooth server, can be simultaneously carried out with step 66, wherein the pairing information may include UUID of the Bluetooth client 10, and the status of the Bluetooth server 20 becomes bundled.

Furthermore, when the Bluetooth server 20 completed the pairing as stated above and if it is turned off and then turned on, the bundled Bluetooth server 20 can check whether the UUID of the Bluetooth client 10 in the pairing information is correct when receiving the pairing command from the Bluetooth client 10 again. If it is correct, the Bluetooth server 20 can again connect with the Bluetooth client 10.

When the Bluetooth server 20 completed the pairing as stated above and if it is turned off and then turned on, the Bundled Bluetooth server 20 cannot connect with another Bluetooth client (not Bluetooth client 10) because the Bluetooth server 20 has been bundled.

Before or starting with step S66, the Bluetooth client 10 and the Bluetooth server 20 would start the connected mode after handshaking. The Bluetooth client 10 can save pairing information therein either simultaneously, before, or after the connected mode. The pairing information at least includes the UUID of the Bluetooth server 20 paired with the Bluetooth client 10. When the Bluetooth client 10 is turned on next time, it would check whether it has the pairing information. If it does, it would start to search the pairing information identical with the Bluetooth server 20 in a pairing table. If such pairing information is found, the Bluetooth client 10 would send out the pairing command to the Bluetooth server 20 to start the connected mode.

In one embodiment, the pairing table is a list of Bluetooth servers that is within a searchable range when the Bluetooth client 10 is in its seeking mode.

Referring to FIG. 2B, the Bluetooth server 20 would not check the password before receiving the pairing command. To assure that the Bluetooth client 10 and Bluetooth server 20 would not be paired with a third party Bluetooth device, the pairing method in the present invention may further include a step S58 (after steps S56 and S66) of sending out a checking code. The pairing method for the Bluetooth server 20 in the present invention may further include steps of S70: receiving a checking code; S72: determining whether the checking code is correct if the checking code is received; S74: if the checking code is not received, determining if it passes a predetermined period of time; and S76: if the checking code is not received within the predetermined period of time or the checking code is incorrect, the Bluetooth server 20 clearing the pairing information and terminating the connected mode. However, if it is still within the determined period of time to receive the checking code, the Bluetooth server 20 is continuously to wait for the checking code.

In one embodiment, the predetermined period of time can be, but not limited to 1, 2, 3, 4, 5, or 10 seconds. The predetermined period of time can be started either at the beginning of the connected mode, or receiving the pairing command. The checking code can be any words, numbers or symbols. In another embodiment, step S70 can be after step S68, or after S66, but not limited to these two scenarios.

In an exemplary embodiment, the Bluetooth system in the present invention has a Bluetooth server 20 and a Bluetooth client 10, and the Bluetooth server 20 has an image 24. The image 24 can be displayed outside on a shell 22 as shown in FIG. 1. The location of the image 24 is not limited in the present invention, and it can be at any place that the user can see it, like the package of the Bluetooth server 20. The image 24 is corresponding to an identifier, and the Bluetooth client 10 can retrieve the image 24 to obtain the identifier and send out a pairing command. The pairing command may include the identifier and the Bluetooth server 20 can start a connected mode with the Bluetooth client 10 according to the pairing command.

The Bluetooth client 10 may include a camera module 12, a first Bluetooth module 14 and a processing unit 16. The camera module 12 is used to retrieve the image 24 and the first Bluetooth module 14 is used to communicate with the Bluetooth server 20. More specifically, the first Bluetooth module 14 is used to communicate with the second Bluetooth module 26. The processing unit 16 is connected with the camera module 12 and the first Bluetooth module 14, and analyzes the image 24 to obtain the identifier. The first Bluetooth module 14 can send out the pairing command and start the connected mode. The processing unit 16 can be referred to a control unit or central processing unit.

The Bluetooth server 20 includes a shell 22 and a Bluetooth module 26. In one embodiment, the image 24 can be displayed on the surface of the shell 22, so the camera module 12 can take the image 24. The second Bluetooth module 26 is inside the shell 22 and communicating with the first Bluetooth module 14. The Bluetooth module 26 can receive the pairing command and check whether the pairing command is correct. If the second Bluetooth module 26 is unbundled, the connected mode can be started. Meanwhile, the second Bluetooth module 26 can save the pairing information either before or after the connected mode, the pairing information including the UUID of the first Bluetooth module 14, while the first Bluetooth module 14's pairing information including the second Bluetooth module's UUID.

When in use, for an unbundled Bluetooth server, the user can simply turn on the Bluetooth server 20 (e.g. a Bluetooth headset) and turn on the Bluetooth client 10 with pairing method in the present invention, taking the image 24 on the Bluetooth server 20 with the camera module 12 in the Bluetooth client 10 to complete the pairing with the Bluetooth client 10 and Bluetooth server 20. For a bundled Bluetooth server 20, the Bluetooth server 20 can be reset to the unbundle status. For example, the user can press on one button on the Bluetooth server 20 for a few seconds and the Bluetooth server 20 would clear up the paring information therein and be reset to the unbundle status.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A pairing method between a Bluetooth server and a Bluetooth client comprising steps of:
   said Bluetooth client retrieving an image, said image corresponding to a first identifier to identify the Bluetooth server;
   said Bluetooth client analyzing the image to obtain the first identifier;
   said Bluetooth client sending out a pairing command that includes the first identifier and a second identifier that is used to identify the Bluetooth client;
   said Bluetooth server receiving said pairing command;
   said Bluetooth server determining whether the first identifier is correct;
   said Bluetooth server determining whether the Bluetooth server's status is bundled or unbundled;
   said Bluetooth server starting a connected mode with a Bluetooth client if the first identifier is correct and the Bluetooth server is unbundled; and
   said Bluetooth server saving the second identifier in the paring information as a predetermined identifier,
   wherein the first and second identifiers are Universal Unique Identifiers (UUIDs).

2. The pairing method between Bluetooth devices of claim 1, further comprising steps of activating a camera module in the Bluetooth client before retrieving the image; activating a Bluetooth module in the Bluetooth client before sending out the pairing command; starting a connected mode after sending out the pairing command and sending out a checking code after starting the connected mode.

3. The pairing method between Bluetooth devices of claim 2, further comprising steps of the Bluetooth server determining whether the checking code is correct if the checking code is received; the Bluetooth server determining whether a predetermined period of time has passed if the checking code is not received; and the Bluetooth server terminating the connected mode if the checking code is not received beyond the predetermined period of time, or the checking code is incorrect.

4. The pairing method between Bluetooth devices of claim 1, wherein the image is a one-dimensional bar code.

5. The pairing method between Bluetooth devices of claim 1, wherein the image is a quick response code (QR Code).

6. The pairing method between Bluetooth devices of claim 1, wherein the two-dimensional bar code is a quick response code (QR Code).

7. The pairing method between Bluetooth devices of claim 1, wherein when the second identifier matches the predetermined identifier saved in the Bluetooth server and if the Bluetooth server's status is bundled, the connected mode is started.

8. The pairing method between Bluetooth devices of claim 7, wherein when the second identifier does not match the predetermined identifier saved in the Bluetooth server, the connected mode will not be started.

9. The pairing method between Bluetooth devices of claim 1, wherein when the first identifier is incorrect, the connected mode will not be started.

10. A Bluetooth system comprising:
    a Bluetooth server including an image corresponding to a first identification code to identify the Bluetooth server;
    a Bluetooth client configured to retrieve and analyze the image to obtain the first identification code and send out a pairing command that includes the first identification code and a second identifier code configured to identify the Bluetooth client; said Bluetooth server starting a connected mode with the Bluetooth client according to the pairing command,
    wherein the first identification code and the second identification code are Universal Unique Identifiers (UUIDs).

11. The Bluetooth system of claim 10, wherein the Bluetooth client includes:
    a camera module to retrieve the image;
    a first Bluetooth module to communicate with the Bluetooth server; and
    a processing unit connecting with the camera module and the first Bluetooth module to analyze the image to obtain the first identification code, and send out the pairing command including the first identification code and second identification code to start the connected mode from the first Bluetooth module, and
    wherein the Bluetooth server includes:
    an image and
    a second Bluetooth module inside a shell of the Bluetooth server and communicating with the first Bluetooth module; said second Bluetooth module configured to receive the pairing command including the first identification code and second identification code to determine whether the first identification code is correct and if the second Bluetooth module is unbundled, and the connected mode is started.

12. The Bluetooth system of claim 11, wherein the second Bluetooth module is configured to save pairing information when the connected mode is started.

13. The Bluetooth system of claim 11, wherein the second Bluetooth module is configured to receive a checking code after starting the connected mode; determine whether the checking code is correct if the checking code is received; determine whether a predetermined period of time has passed if the checking code is not received; and terminate the connected mode if the checking code is not received beyond the predetermined period of time, or the checking code is incorrect.

14. The Bluetooth system of claim 11, wherein when the second identification code matches the predetermined identification code saved in the Bluetooth server and if the Bluetooth server's status is bundled, the connected mode is started.

15. The Bluetooth system of claim 14, wherein when the second identification code does not match the predetermined identification code saved in the Bluetooth server, the connected mode will not be started.

16. The Bluetooth system of claim 11, wherein when the first identification code is incorrect, the connected mode will not be started.

\* \* \* \* \*